United States Patent
Elbkaily et al.

(10) Patent No.: US 11,603,140 B2
(45) Date of Patent: Mar. 14, 2023

(54) VEHICLE INSTRUMENT PANEL ASSEMBLY

(71) Applicant: Ford Global Technologies, LLC, Dearborn, MI (US)

(72) Inventors: Marwan Elbkaily, Canton, MI (US); Gururaj Aralikatti, Farmington, MI (US); Tushar B. Kamble, Farmington, MI (US); Shane Scherbarth, Plymouth, MI (US); Robert A. Chanko, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 229 days.

(21) Appl. No.: 17/182,291

(22) Filed: Feb. 23, 2021

(65) Prior Publication Data

US 2022/0266921 A1 Aug. 25, 2022

(51) Int. Cl.
*B62D 25/14* (2006.01)
*B60K 37/02* (2006.01)

(52) U.S. Cl.
CPC ............ *B62D 25/145* (2013.01); *B60K 37/02* (2013.01)

(58) Field of Classification Search
CPC .................................................. B62D 25/145
USPC .................................................. 296/193.02
See application file for complete search history.

(56) References Cited

U.S. PATENT DOCUMENTS

| | | | |
|---|---|---|---|
| 5,312,133 A | 5/1994 | Pietila et al. | |
| 5,810,393 A * | 9/1998 | Joest ................. | B62D 25/145 280/779 |
| 6,213,504 B1 * | 4/2001 | Isano ................. | B60R 21/045 296/70 |
| 6,582,011 B2 | 6/2003 | Palazzolo et al. | |
| 7,735,865 B2 | 6/2010 | Cappabianca et al. | |
| 7,735,905 B2 | 6/2010 | Mullen et al. | |
| 8,534,739 B2 | 9/2013 | Busuioc et al. | |
| 9,174,537 B1 | 11/2015 | Webb et al. | |
| 9,233,415 B2 * | 1/2016 | Nakano ............. | B21D 53/88 |

(Continued)

FOREIGN PATENT DOCUMENTS

| DE | 102012022783 A1 | 5/2014 |
|---|---|---|
| EP | 1306243 B1 | 8/2004 |

(Continued)

*Primary Examiner* — Joseph D. Pape
(74) *Attorney, Agent, or Firm* — Vichit Chea; Price Heneveld LLP (57) ABSTRACT

An instrument panel assembly for a vehicle includes an instrument panel body including a driver-side portion, a center stack portion, and a passenger-side portion. A cross-car beam assembly is configured to at least partially support the instrument panel body and includes a horizontal member extending across at least the passenger-side portion of the instrument panel body. A first lower reinforcement bracket is spaced apart from the horizontal member and extends across the passenger-side portion of the instrument panel body. A second lower reinforcement bracket is coupled with the first lower reinforcement bracket. A vertical reinforcement bracket extends between the horizontal member and the first and second lower reinforcement brackets. The vertical reinforcement bracket includes a curved portion proximate a first end and coupled with the horizontal member. A second end of the vertical reinforcement bracket is coupled with at least one of the first and second lower reinforcement brackets.

17 Claims, 7 Drawing Sheets

(56) References Cited

U.S. PATENT DOCUMENTS

| | | | |
|---|---|---|---|
| 9,250,721 B2 | 2/2016 | Mkrtchyan et al. | |
| 9,457,755 B2 * | 10/2016 | Merkel | B60R 21/04 |
| 2014/0103685 A1 * | 4/2014 | Mani | B62D 25/145 |
| | | | 29/897.2 |
| 2019/0031247 A1 | 1/2019 | Baudart | |

FOREIGN PATENT DOCUMENTS

| | | |
|---|---|---|
| GB | 2401353 A | 10/2004 |
| JP | 2005231507 A | 9/2005 |
| JP | 2006062531 A | 3/2006 |
| KR | 0151666 B1 | 6/1998 |
| KR | 20170084341 A | 7/2017 |

\* cited by examiner

VEHICLE INSTRUMENT PANEL ASSEMBLY

FIELD OF THE DISCLOSURE

The present disclosure generally relates to an instrument panel assembly, and more specifically, to an instrument panel assembly for a vehicle.

BACKGROUND OF THE DISCLOSURE

Vehicle instrument panels may include a cross-car beam assembly configured to at least partially support a body of the instrument panel. The cross-car beam assembly may include one or more brackets.

SUMMARY OF THE DISCLOSURE

According to one aspect of the present disclosure, an instrument panel assembly for a vehicle includes an instrument panel body including a driver-side portion, a center stack portion, and a passenger-side portion is provided. A cross-car beam assembly is configured to at least partially support the instrument panel body and includes a horizontal member extending across at least the passenger-side portion of the instrument panel body. A first lower reinforcement bracket is spaced apart from the horizontal member and extends across the passenger-side portion of the instrument panel body. A second lower reinforcement bracket is coupled with the first lower reinforcement bracket. A vertical reinforcement bracket extends between the horizontal member and the first and second lower reinforcement brackets. The vertical reinforcement bracket includes a curved portion proximate a first end and coupled with the horizontal member. A second end of the vertical reinforcement bracket is coupled with at least one of the first and second lower reinforcement brackets.

Embodiments of this aspect and/or the other aspects of the disclosure can include any one or a combination of the following features:
- a first lower reinforcement bracket including a flange proximate a second lower reinforcement bracket and a second end of a vertical reinforcement bracket coupled with the flange;
- a first lower reinforcement bracket including a plurality of slots;
- a vertical reinforcement bracket including laterally opposing feet extending from a second end of the vertical reinforcement bracket;
- an upper support bracket extending from a horizontal member proximate a passenger-side portion of an instrument panel body, and a plurality of upper reinforcement brackets, wherein at least one of the plurality of upper reinforcement brackets is coupled with the upper support bracket; and/or
- a central support bracket coupled with a first lower reinforcement bracket and a horizontal member, and a plurality of upper reinforcement brackets, wherein at least one of the plurality of upper reinforcement brackets is coupled with the central support bracket.

According to another aspect of the present disclosure, an instrument panel assembly for a vehicle includes an instrument panel body is provided. A cross-car beam assembly is positioned to at least partially support the instrument panel body and includes a horizontal member and at least one support bracket. A lower reinforcement bracket is fixedly coupled with the at least one support bracket. A vertical reinforcement bracket includes a first end coupled with the horizontal member and a second end coupled with the lower reinforcement bracket. The vertical reinforcement bracket includes a curved portion proximate the first end.

Embodiments of this aspect and/or the other aspects of the disclosure can include any one or a combination of the following features:
- at least one support bracket including first and second outboard support brackets and a central support bracket, and a horizontal member extending between the first and second outboard support brackets;
- a lower reinforcement bracket extending between a central support bracket and a second outboard support bracket;
- a lower reinforcement bracket including an upper edge and a lower edge such that the lower reinforcement bracket is substantially C-shaped and opens vehicle forward;
- a lower reinforcement bracket including a flange integrally formed with an upper edge and configured to be fixedly coupled with a second end of a vertical reinforcement bracket;
- a lower reinforcement bracket including a plurality of slots;
- a lower reinforcement bracket includes a first member welded with a second member; and/or
- a lower reinforcement bracket including one or more offsets integrally formed with a central portion.

According to another aspect of the present disclosure, an instrument panel assembly for a vehicle includes a cross-car beam assembly including a driver-side portion, a center stack portion, and a passenger-side portion is provided. The cross-car beam assembly includes a horizontal member extending across at least the passenger-side portion. A lower reinforcement bracket is spaced apart from the horizontal member and extends across the passenger-side portion of the cross-car beam assembly. A vertical reinforcement bracket extends between the horizontal member and the lower reinforcement bracket. The vertical reinforcement bracket includes a curved portion proximate the horizontal member.

Embodiments of this aspect and/or the other aspects of the disclosure can include any one or a combination of the following features:
- an upper support bracket extending from a planar surface of a horizontal member and an upper reinforcement bracket fixedly coupled with the upper support bracket and extending substantially parallel with the horizontal member;
- a cross-car beam assembly including first and second outboard support brackets and first and second central support brackets, wherein a lower reinforcement bracket is coupled with the second outboard support bracket and the second central support bracket;
- a lower reinforcement bracket including a plurality of elongated slots;
- a lower reinforcement bracket including an offset extending vehicle forward; and/or
- a vertical reinforcement bracket including a lower portion fixedly coupled with a curved portion and a lower reinforcement bracket.

These and other aspects, objects, and features of the present disclosure will be understood and appreciated by those skilled in the art upon studying the following specification, claims, and appended drawings.

DETAILED DESCRIPTION OF THE DISCLOSURE

The present illustrated embodiments reside primarily in combinations of method steps and apparatus components related to a vehicle instrument panel assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
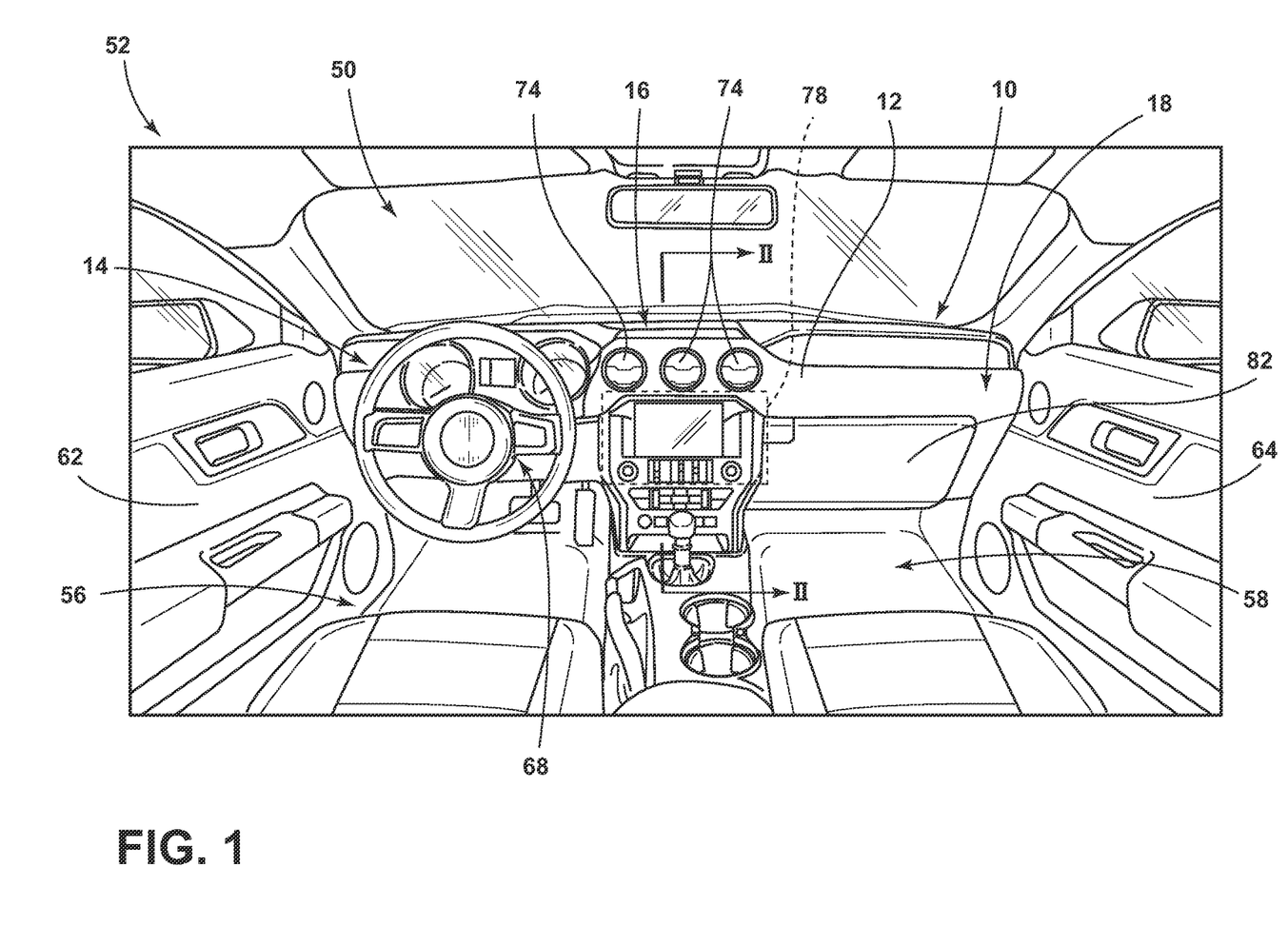
FIG. 1 is a front perspective view of a vehicle cabin including an instrument panel assembly, according to various examples.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-5B, reference numeral 10 generally designates an instrument panel assembly 10 including an instrument panel body 12. The instrument panel body 12 includes a driver-side portion 14, a center stack portion 16, and a passenger-side portion 18. A cross-car beam assembly 20 extends within and is configured to support the instrument panel body 12. The cross-car beam assembly 20 includes a horizontal member 22 extending across at least the passenger-side portion 18 of the instrument panel body 12. A first lower reinforcement bracket 24 is spaced apart from the horizontal member 22 and extends across the passenger-side portion 18. A second lower reinforcement bracket 26 is coupled with the first lower reinforcement bracket 24. A vertical reinforcement bracket 28 extends between the horizontal member 22 and the first and second lower reinforcement brackets 24, 26. The vertical reinforcement bracket 28 includes a curved portion 30 forming a first end 32 of the vertical reinforcement bracket 28. The first end 32 is coupled with the horizontal member 22, and a second end 34 of the vertical reinforcement bracket 28 may be coupled with at least one of the first and second lower reinforcement brackets 24, 26.

Referring now to FIG. 1, an interior cabin 50 of a vehicle 52 is exemplarily illustrated. The vehicle 52 includes an instrument panel assembly 10 including an instrument panel body 12. The instrument panel assembly 10 is located vehicle forward in the cabin 50 and includes a driver-side portion 14, a center stack portion 16, and a passenger-side portion 18. These portions of the instrument panel body 12, and particular regions or locations within them, often have differing mechanical property requirements.

The driver-side and passenger-side portions 14, 18 of the instrument panel body 12 are in substantial proximity to respective driver-side and passenger-side regions 56, 58 of the vehicle 52. The center stack portion 16 is connected to both the driver-side portion 14 and the passenger-side portion 18 of the instrument panel body 12 such that the center stack portion 16 is positioned between the driver-side portion 14 and the passenger-side portion 18 of the instrument panel body 12.

Figure 2:
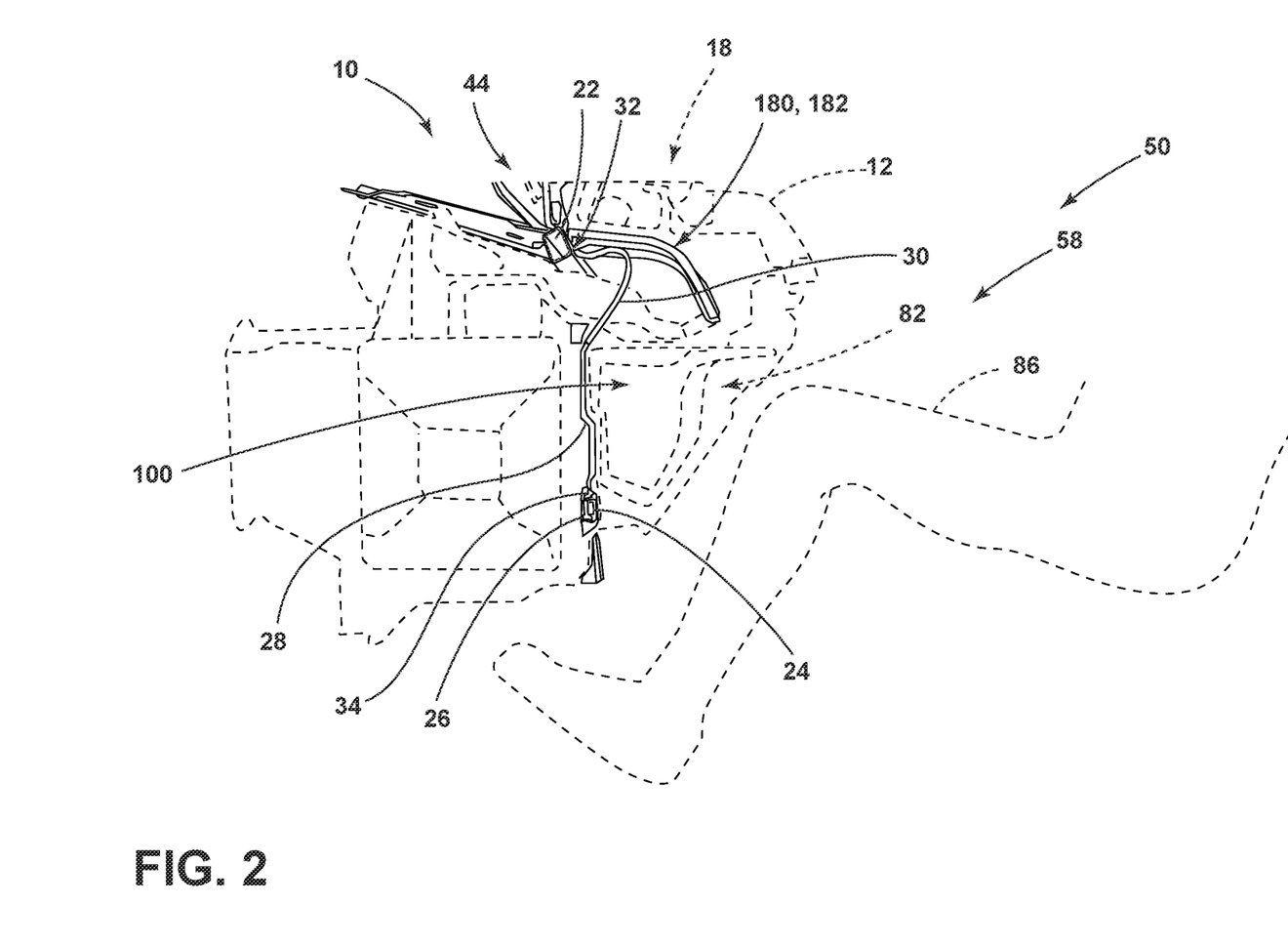
FIG. 2 is a side cross-sectional view of the instrument panel assembly of FIG. 1 taken along line II-II with an instrument panel body shown in phantom and a cross-car beam assembly coupled with a plurality of reinforcement brackets.

Referring now to FIGS. 1 and 2, the instrument panel assembly 10 includes the instrument panel body 12 and a cross-car beam assembly 20, as introduced above. The cross-car beam assembly 20 may be positioned at least partially within and/or vehicle forward of the instrument panel body 12 and is coupled to the instrument panel body 12 at multiple points. While the instrument panel assembly 10 is illustrated in an exemplary vehicle 52, it is contemplated that the vehicle 52 may be any type of vehicle, such as a car, a truck, a van, etc. without departing from the scope of the present disclosure.

Referring again to FIG. 1, the driver-side portion 14 of the instrument panel body 12 may include an instrument cluster, covering for the instruments (e.g., an instrument cluster hood), and other similar components. A steering column 68 may be supported by one or both of the instrument panel body 12 and a cross-car beam assembly 20 positioned within the instrument panel body 12. The steering column 68 may engage a steering system (not shown) vehicle forward of the instrument panel assembly 10. The instrument panel assembly 10 may further include an HVAC system 78 having a plurality of air vents 74 located within the instrument panel body 12. The HVAC system 78 may be positioned vehicle forward of the instrument panel body 12 and/or may be partially received by the instrument panel body 12. As also depicted in FIG. 1, the passenger-side portion 18 of the instrument panel body 12 may include a glove box assembly 82, as discussed in more detail elsewhere herein.

As used in this disclosure, "outboard" refers to the lateral sides or regions most proximate to a driver-side door 62 and a passenger-side door 64 in the vehicle 52. The term "inboard" as used in this disclosure refers to a central area in the vehicle 52 inboard from the laterally opposing outboard sides or regions.

Referring again to FIGS. 2 and 3, a cross-section of the instrument panel assembly 10 is illustrated with the instrument panel body 12 in phantom and an exemplary occupant 86 positioned proximate the passenger-side portion 18 of the instrument panel body 12. The cross-car beam assembly 20 includes a driver-side portion 90, a center stack portion 92, and a passenger-side portion 94. The cross-car beam assembly 20 may define a steering column space 98 and a glove box aperture 100 on the respective driver-side and passenger-side portions 90, 94. The glove box aperture 100 is configured to receive the glove box assembly 82, as shown in FIG. 2, such that the glove box assembly 82 is positioned proximate the occupant 86. In various examples, the glove box assembly 82 may be formed of a softened material.

Figure 3:
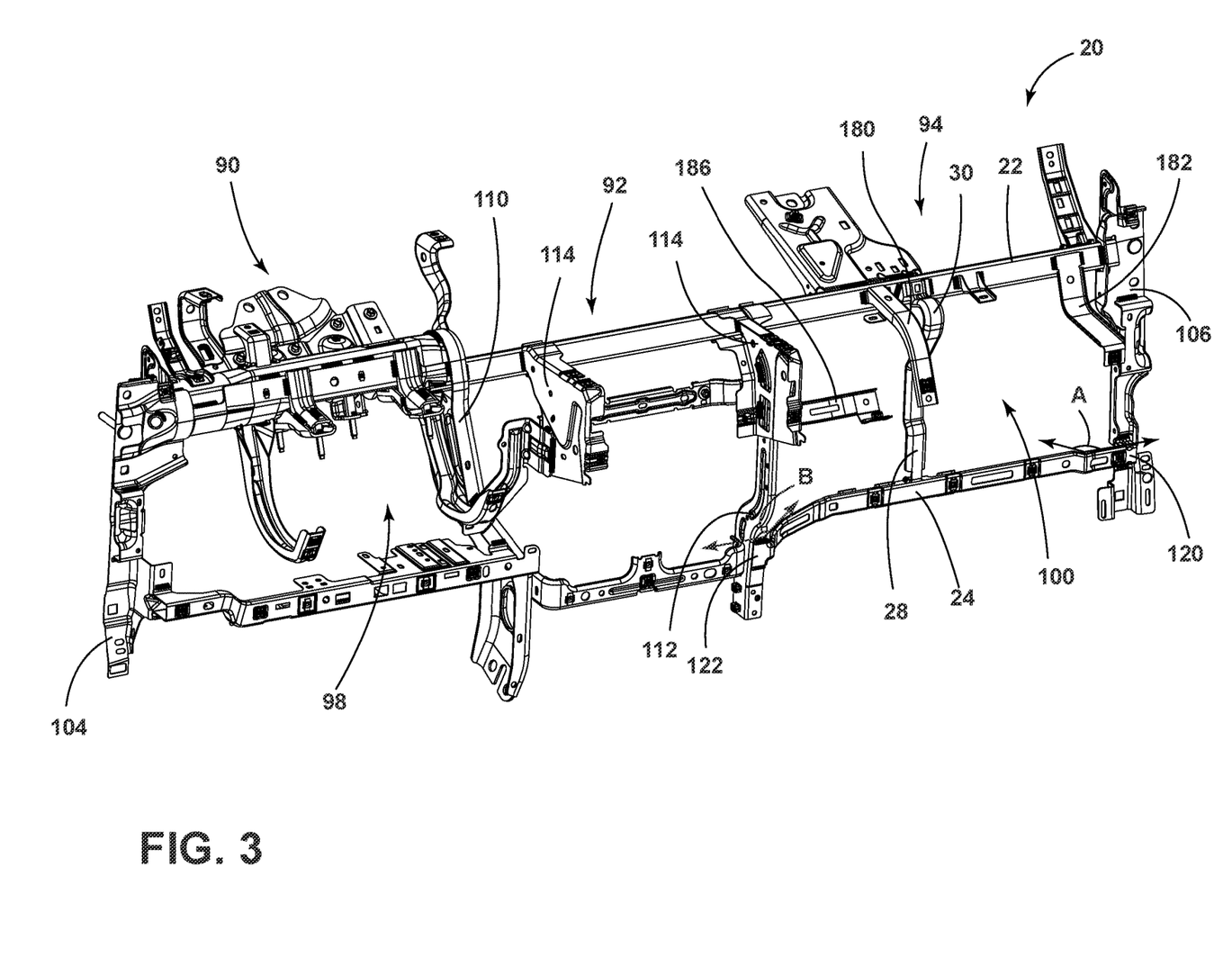
FIG. 3 is a front perspective view of the cross-car beam assembly and the plurality of reinforcement brackets of FIG. 2.

As previously introduced, the instrument panel assembly 10 includes a cross-car beam assembly 20 and a plurality of reinforcement brackets 24, 26, 28, 186 coupled with the cross-car beam assembly 20. As shown in FIGS. 2 and 3, the cross-car beam assembly 20 may be positioned within the instrument panel body 12. Each of the plurality of reinforcement brackets 24, 26, 28, 186 may be configured to be coupled with or integrally formed with the cross-car beam assembly 20.

As best shown in FIG. 3, the cross-car beam assembly 20 includes a horizontal member 22 extending between a first outboard support bracket 104 and a second outboard support bracket 106. The first outboard support bracket 104 is positioned proximate the driver-side door 62, and the second outboard support bracket 106 is positioned proximate the passenger-side door 64. The cross-car beam assembly 20 further includes first and second central support brackets 110, 112 spaced apart from the first and second outboard support brackets 104, 106, respectively. The first outboard support bracket 104 and the first central support bracket 110 define the driver-side portion 90 of the cross-car beam assembly 20, and the second outboard support bracket 106 and the second central support bracket 112 define the passenger-side portion 94 of the cross-car beam assembly 20. The first and second central support brackets 110, 112 may further be positioned to separate the driver-side portion 90 of the cross-car beam assembly 20 and the passenger-side portion 94 of the cross-car beam assembly 20 from the center stack portion 92.

In various examples, center stack frame brackets 114 may be coupled with one or both of the first and second central support brackets 110, 112. The center stack frame brackets 114 may extend outward from the first and second central support brackets 110, 112 or may be aligned with the first and second central support brackets 110, 112. In various examples, the center stack frame brackets 114 may be integrally formed with the central support brackets 110, 112 or may be coupled with the central support brackets 114. For example, the center stack frame brackets 114 may be welded or fastened to one or both of the central support brackets 110, 112.

Figure 4:
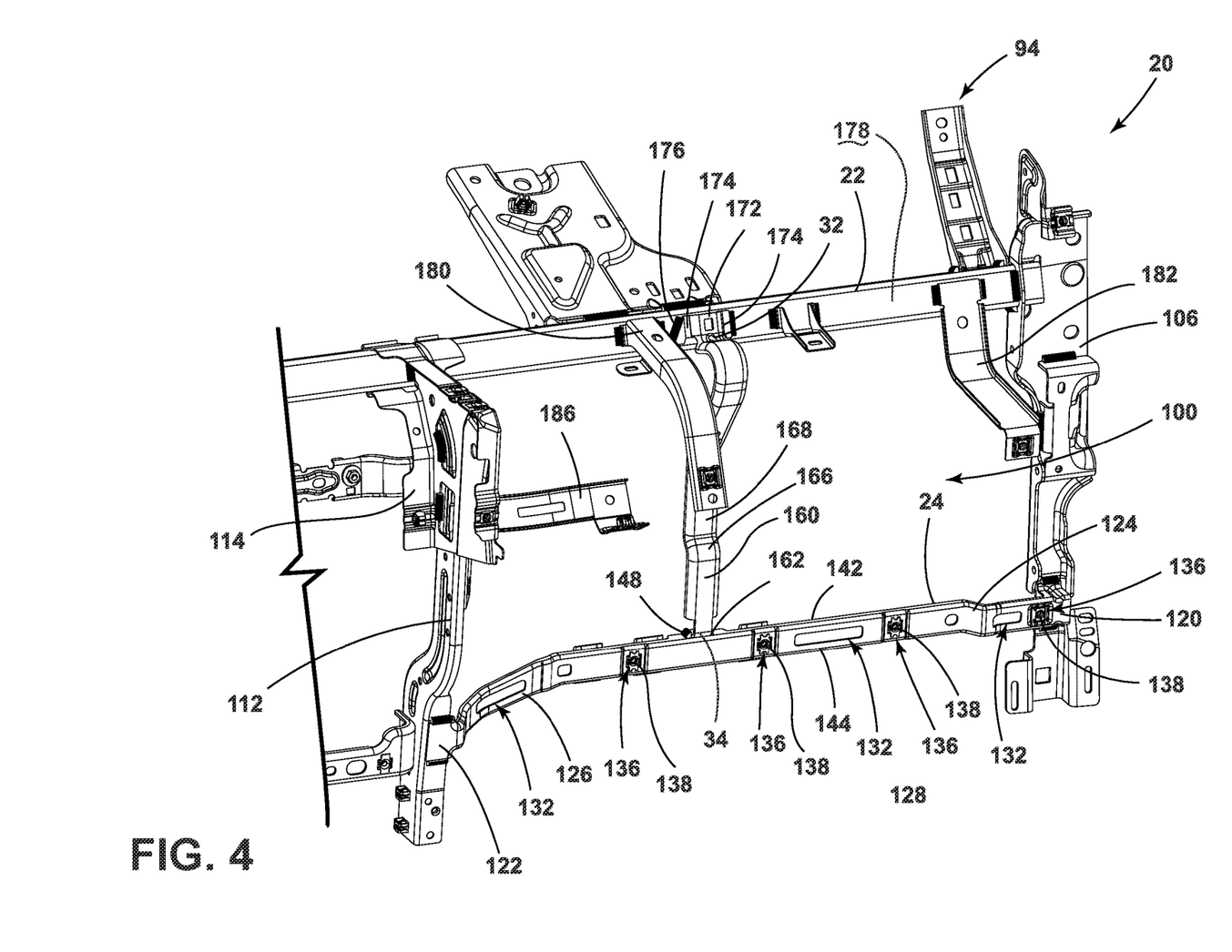
FIG. 4 is a front perspective view of a passenger-side portion of the cross-car beam assembly of FIG. 3.
Figure 5:
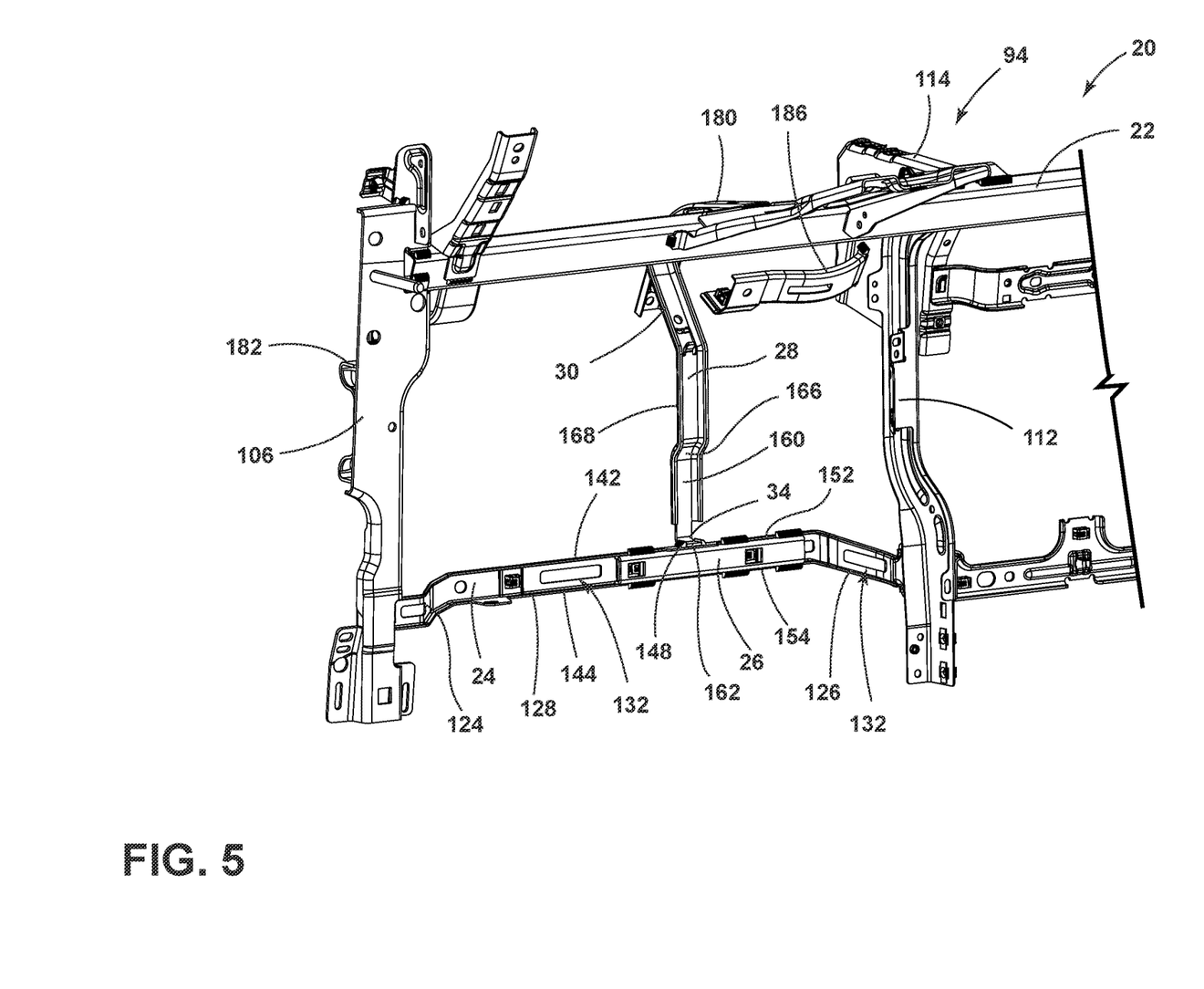
FIG. 5 is a rear perspective view of a passenger-side portion of the cross-car beam assembly of FIG. 3.

Referring now to FIGS. 4 and 5, the cross-car beam assembly 20 includes the first lower reinforcement bracket 24, as previously introduced. The first lower reinforcement bracket 24 includes an outboard end 120 coupled with the second outboard support bracket 106. For example, the outboard end 120 may be welded or otherwise fixedly coupled with the second outboard support bracket 106. Alternatively, the outboard end 120 may be coupled with the second outboard support bracket 106 using a fastener or may integrally formed with the second outboard support bracket 106.

The first lower reinforcement bracket 24 further includes an inboard end 122 positioned on an opposing side of the first lower reinforcement bracket 24. The inboard end 122 of the first lower reinforcement bracket 24 is coupled with the second central support bracket 112. For example, the inboard end 122 may be fixedly coupled with the second central support bracket 112 via welding. Alternatively, the inboard end 122 may be coupled with the second central support bracket 112 using a fastener or may be integrally formed with the second central support bracket 112. In various examples, the inboard end 122 may further be at least partially supported by and/or coupled with one of the center stack frame brackets 114.

With continued reference to FIGS. 4 and 5, the first lower reinforcement bracket 24 further includes an outboard offset 124 integrally formed with and extending at an angle A relative to the outboard end 120 of the first lower reinforcement bracket 24. The outboard offset 124 is configured to extend vehicle forward of the outboard end 120 (e.g., away from an occupant 86 of the passenger-side region 58). An inboard offset 126 may be integrally formed with the inboard end 122 of the first lower reinforcement bracket 24. The inboard offset 126 is further defined to extend vehicle forward of the inboard end 122 (e.g., in the same direction as the outboard offset 124). In various examples, the inboard offset 126 may be the same size and shape as the outboard offset 124. In other examples, the inboard offset 126 may be longer than the outboard offset 124 and may define an angle B relative to the inboard end 122. The angle B may be larger than angle A.

A central portion 128 of the first lower reinforcement bracket 24 extends between the outboard and inboard offsets 124, 126. The central portion 128 is integrally formed with each of the outboard and inboard offsets 124, 126 and may be substantially linear. It is contemplated that the central portion 128 may include other offsets without departing from the scope of the present disclosure. The central portion 128 is configured to be coupled with the second lower reinforcement bracket 26, as described in more detail elsewhere herein.

The first lower reinforcement bracket 24 defines a plurality of slots 132. Each of the plurality of slots 132 may be defined by any portion of the first lower reinforcement bracket 24, including, but not limited to, for example, the outboard offset 124, the inboard offset 126, and/or the central portion 128. Each of the plurality of slots 132 may be defined to have an obround shape and/or may be defined to be extend along at least a portion of the first lower reinforcement bracket 24. It will be understood that any number and/or configuration of slots 132 may be defined by the first lower reinforcement bracket 24 without departing from the scope of the present disclosure. The slots 132 may be positioned to create varying degrees of bendability along the portions of the lower reinforcement bracket 24 when pressure is applied to the first lower reinforcement bracket 24.

The central portion 128 may further define a plurality of receiving wells 136 configured to receive fasteners 138. Each of the fasteners 138 is configured to be received by a respective receiving well 136. In various examples, the fasteners 138 may be configured to couple other components of the instrument panel assembly 10 with the cross-car beam assembly 20.

Figure 6:
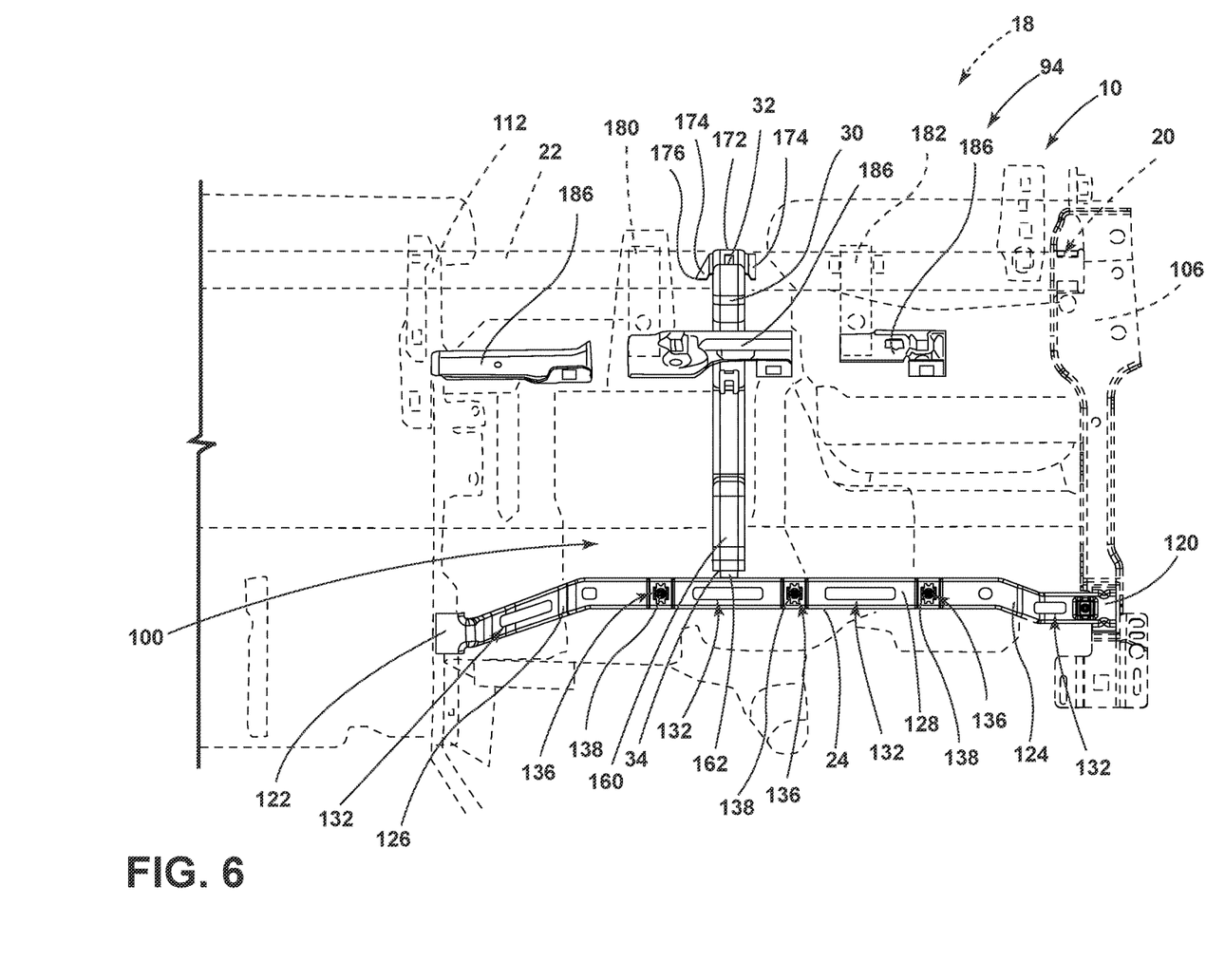
FIG. 6 is a front perspective view of the instrument panel assembly of FIG. 1 with an instrument panel body shown in phantom and a plurality of reinforcement brackets.

Referring still to FIGS. 4 and 5, the passenger-side portion 94 of the cross-car beam assembly 20 is illustrated. As best shown in FIG. 6, the first lower reinforcement bracket 24 includes an upper edge 142 and a lower edge 144 spaced apart by the central portion 128. Each of the upper and lower edges 142, 144 may be integrally formed with the central portion 128 and is configured to extend vehicle forward of the cross-car beam assembly 20. In other words, the upper and lower edges 142, 144 may extend from the central portion 128 of the first lower reinforcement bracket 24 such that the first lower reinforcement bracket 24 is configured as a C-shaped bracket opening vehicle forward. The C-shape of the first lower reinforcement bracket 24 may provide additional support to portions of the HVAC system 78 that extend proximate the glove box assembly 82 (see FIGS. 6 and 7).

As previously introduced, the first lower reinforcement bracket 24 is coupled with the second lower reinforcement bracket 26. The second lower reinforcement bracket 26 is positioned to be fixedly coupled with at least the central portion 128 of the first lower reinforcement bracket 24. As best shown in FIG. 5, the second lower reinforcement bracket 26 is positioned between the upper edge 142 and the lower edge 144 of the first lower reinforcement bracket 24. In various examples, the second lower reinforcement bracket 26 may include an upper edge 152 positioned in contact with the upper edge 142 of the first lower reinforcement bracket 24, and the second lower reinforcement bracket 26 may further include a lower edge 154 positioned in contact with the lower edge 144 of the first lower reinforcement bracket 24. In various examples, the upper edges 142, 152 may be fixedly coupled together (e.g., via welding) and/or the lower edges 144, 154 may be fixedly coupled together (e.g., via welding). Welding of the first and second lower reinforcement brackets 24, 26 may provide additional stiffness to the central portion 128 of the first lower reinforcement bracket 24. One or both of the upper edges 142, 152 may define a flange 148 extending vehicle forward of the first and second lower reinforcement brackets 24, 26 and configured to be coupled with the vertical reinforcement bracket 28, as described in more detail elsewhere herein.

With continued reference to FIGS. 4 and 5, the cross-car beam assembly 20 may further include the vertical reinforcement bracket 28 extending between the first and second lower reinforcement brackets 24, 26 and the horizontal member 22 of the cross-car beam assembly 20. The vertical reinforcement bracket 28 includes a lower portion 160 and the upper curved portion 30. As illustrated, the lower portion 160 and the upper curved portion 30 may be integrally formed as a single vertical reinforcement bracket 28. Alternatively, the lower portion 160 and the upper curved portion 30 may be separate brackets fixedly coupled together (e.g., via welding) to define the vertical reinforcement bracket 28.

As best shown in FIG. 4, the lower portion 160 includes a foot 162 extending vehicle forward of the lower portion 160. The foot 162 is configured to be at least partially supported by one of the upper edges 142, 152 and/or the flange 148 of the first and second lower reinforcement brackets 24, 26. As illustrated, the foot 162 may be positioned to extend substantially perpendicular to the lower portion 160 of the vertical reinforcement bracket 28 and contacts and/or aligns with the flange 148. The foot 162 may be coupled with the flange 148. For example, the foot 162 may be welded to the flange 148.

The vertical reinforcement bracket 28 further includes an offset 166 extending vehicle forward of the lower portion 160. The offset 166 extends from the lower portion 160 to a central portion 168 of the vertical reinforcement bracket 28. In assembly, the central portion 168 may be positioned between the lower portion 160 and the curved portion 30. The central portion 168 may be coupled with or integrally formed with one or both of the upper curved portion 30 and the lower portion 160 of the vertical reinforcement bracket 28.

The vertical reinforcement bracket 28 further includes a protrusion 172 extending outward from the upper curved portion 30. The protrusion 172 is configured to at least partially abut the horizontal member 22. For example, the horizontal member 22 may include a planar surface 178 configured to be coupled with the protrusion 172. The protrusion 172 may be fixedly coupled with the horizontal member 22 (e.g., via welding). In various examples, the protrusion 172 may further include one or more laterally opposing feet 174. Each foot 174 extends at least partially along the horizontal member 22. In various examples, as illustrated, one of the one or more laterally extending feet 174 may include an angled edge 176. Each of the one or more feet 174 may be configured to be fixedly coupled with the horizontal member 22. For example, the feet 174 may be fixedly coupled with the horizontal member 22 (e.g., via welding).

Referring now to FIGS. 3-7, one or more forwardly extending upper support brackets 180, 182 may further be coupled with the horizontal member 22. For example, the one or more forwardly extending upper support brackets 180, 182 may be coupled with the planar surface 178 of the horizontal member 22. As illustrated, the cross-car beam assembly 20 includes a first forwardly extending upper bracket 180 and a second forwardly extending upper bracket 182. Each of the first and second upper support brackets 180, 182 extend from the horizontal member 22 toward the interior cabin 50 of the vehicle 52, as shown in FIG. 2.

One or more upper reinforcement brackets 186 may be coupled with the cross-car beam assembly 20. Each upper reinforcement bracket 186 may be positioned substantially parallel to the horizontal member 22. For example, an upper reinforcement bracket 186 may be coupled with the second central support bracket 112 and may extend at least partially toward the second outboard support bracket 106. The upper reinforcement bracket 186 may be one of a plurality of upper reinforcement brackets 186 or may be a single bracket. The upper reinforcement bracket 186 may be fixedly coupled with the second central support bracket 112. For example, the upper reinforcement bracket 186 may be welded with the second central support bracket 112.

Figure 7:
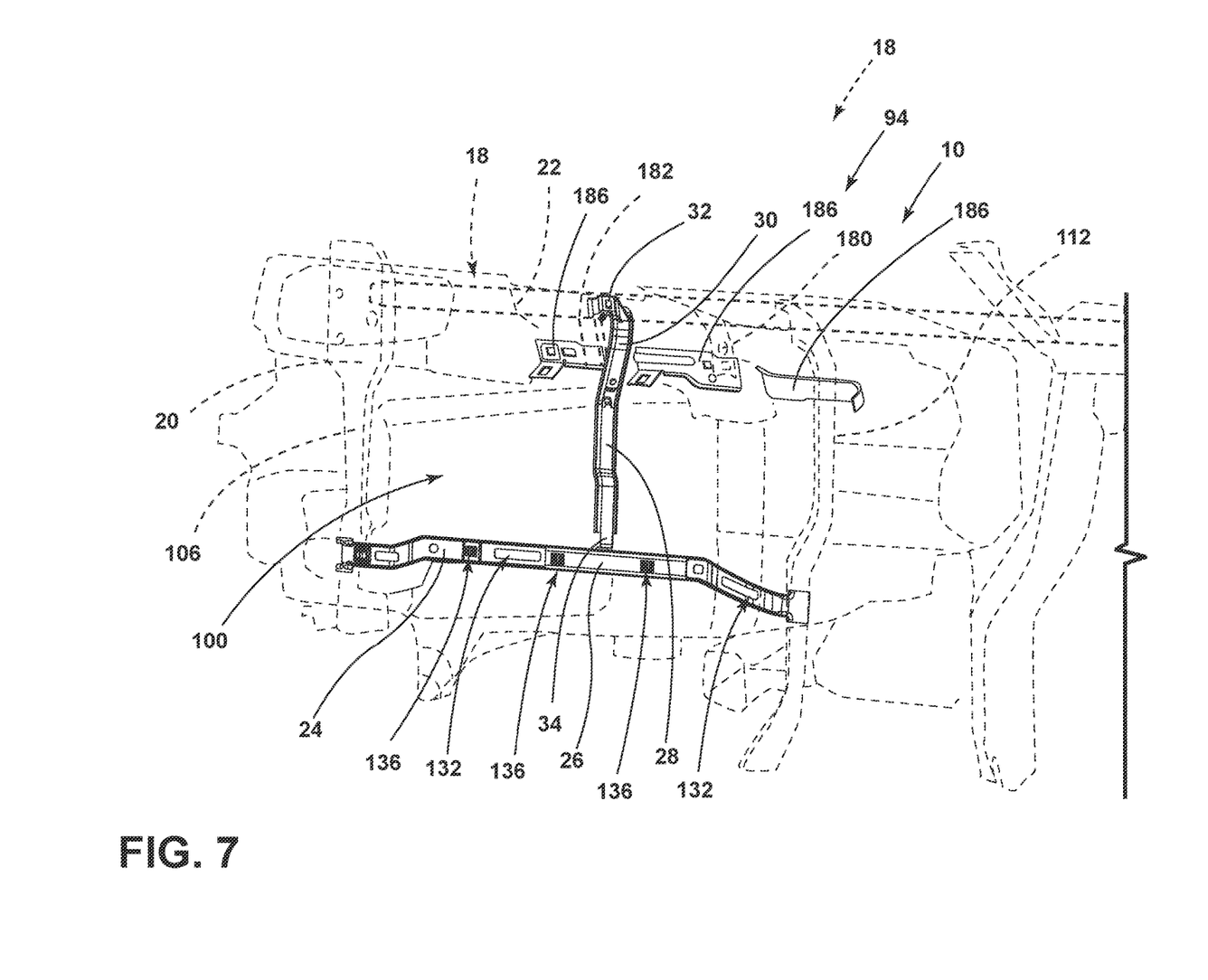
FIG. 7 is a rear perspective view of the instrument panel assembly of FIG. 6.

Referring now to FIGS. 6 and 7, the instrument panel body 12 and the passenger-side portion 94 of the cross-car beam assembly 20 are illustrated in phantom. The plurality of reinforcement brackets 24, 26, 28, 186 are illustrated coupled with the cross-car beam assembly 20. As best illustrated in FIGS. 6 and 7, in other examples, the one or more upper reinforcement brackets 186 may include a plurality of upper reinforcement brackets 186. Each of the plurality of upper reinforcement brackets 186 may be positioned on one or more of the upper brackets 180, 182. For example, as illustrated, the plurality of upper reinforcement brackets 186 may include a bracket 186 positioned on each of the first and second upper brackets 180, 182. It is contemplated that any number of upper reinforcement brackets 186 may be used without departing from the scope of the present disclosure.

The cross-car beam assembly 20 and the cross-car beam assembly 20 as described may be configured to provide additional structure within the instrument panel assembly 10. For example, each of the reinforcement brackets 24, 26, 28, 186 coupled with the cross-car beam assembly 20 as illustrated is positioned to provide additional support to the glove box assembly 82. It is contemplated that the reinforcement brackets 24, 26, 28, 186 may further support other components of the instrument panel assembly 10.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An instrument panel assembly for a vehicle, comprising:
    an instrument panel body including a driver-side portion, a center stack portion, and a passenger-side portion;
    a cross-car beam assembly configured to at least partially support the instrument panel body and including a horizontal member extending across at least the passenger-side portion of the instrument panel body;
    a first lower reinforcement bracket spaced apart from the horizontal member and extending across the passenger-side portion of the instrument panel body;
    a second lower reinforcement bracket coupled with the first lower reinforcement bracket; and
    a vertical reinforcement bracket extending between the horizontal member and the first and second lower reinforcement brackets, wherein the vertical reinforcement bracket includes a curved portion proximate a first end, the first end coupled with the horizontal member and a second end coupled with at least one of the first and second lower reinforcement brackets, wherein the vertical reinforcement bracket includes laterally opposing feet extending from the second end.

2. The instrument panel assembly of claim 1, wherein the first lower reinforcement bracket includes a flange proximate the second lower reinforcement bracket and the second end of the vertical reinforcement bracket is coupled with the flange.

3. The instrument panel assembly of claim 1, wherein the first lower reinforcement bracket includes a plurality of slots.

4. The instrument panel assembly of claim 1, further comprising:
    an upper support bracket extending from the horizontal member proximate the passenger-side portion; and
    a plurality of upper reinforcement brackets, wherein at least one of the plurality of upper reinforcement brackets is coupled with the upper support bracket.

5. The instrument panel assembly of claim 1, further comprising:
    a central support bracket coupled with the first lower reinforcement bracket and the horizontal member; and
    a plurality of upper reinforcement brackets, wherein at least one of the plurality of upper reinforcement brackets is coupled with the central support bracket.

6. An instrument panel assembly for a vehicle, comprising:
    an instrument panel body;
    a cross-car beam assembly positioned to at least partially support the instrument panel body and including a horizontal member and at least one support bracket;
    a lower reinforcement bracket fixedly coupled with the at least one support bracket; and
    a vertical reinforcement bracket including a first end coupled with the horizontal member and a second end coupled with the lower reinforcement bracket, wherein the vertical reinforcement bracket includes a curved portion proximate the first end, wherein the lower reinforcement bracket includes an upper edge and a lower edge such that the lower reinforcement bracket is substantially C-shaped and opens vehicle forward.

7. The instrument panel assembly of claim 6, wherein the at least one support bracket includes first and second outboard support brackets and a central support bracket, and further wherein the horizontal member extending between the first and second outboard support brackets.

8. The instrument panel assembly of claim 7, wherein the lower reinforcement bracket extends between the central support bracket and the second outboard support bracket.

9. The instrument panel assembly of claim 6, wherein the lower reinforcement bracket includes a flange integrally formed with the upper edge and configured to be fixedly coupled with the second end of the vertical reinforcement bracket.

10. The instrument panel assembly of claim 6, wherein the lower reinforcement bracket includes a plurality of slots.

11. The instrument panel assembly of claim 6, wherein the lower reinforcement bracket includes a first member welded with a second member.

12. The instrument panel assembly of claim 6, wherein the lower reinforcement bracket includes one or more offsets integrally formed with a central portion.

13. An instrument panel assembly for a vehicle, comprising:
- a cross-car beam assembly including a driver-side portion, a center stack portion, and a passenger-side portion, the cross-car beam assembly including a horizontal member extending across at least the passenger-side portion;
- a lower reinforcement bracket spaced apart from the horizontal member and extending across the passenger-side portion of the cross-car beam assembly;
- a vertical reinforcement bracket extending between the horizontal member and the lower reinforcement bracket, wherein the vertical reinforcement bracket includes a curved portion proximate the horizontal member;
- an upper support bracket extending from a planar surface of the horizontal member; and
- an upper reinforcement bracket fixedly coupled with the upper support bracket and extending substantially parallel with the horizontal member.

14. An instrument panel assembly for a vehicle, comprising,
- a cross-car beam assembly including a driver-side portion, a center stack portion, and a passenger-side portion, the cross-car beam assembly including a horizontal member extending across at least the passenger-side portion;
- a lower reinforcement bracket spaced apart from the horizontal member and extending across the passenger-side portion of the cross-car beam assembly;
- a vertical reinforcement bracket extending between the horizontal member and the lower reinforcement bracket, wherein the vertical reinforcement bracket includes a curved portion proximate the horizontal member, wherein the cross-car beam assembly includes first and second outboard support brackets and first and second central support brackets, and further wherein the lower reinforcement bracket is coupled with the second outboard support bracket and the second central support bracket.

15. The instrument panel assembly of claim 13, wherein the lower reinforcement bracket includes a plurality of elongated slots.

16. The instrument panel assembly of claim 13, wherein the lower reinforcement bracket includes an offset extending vehicle forward.

17. The instrument panel assembly of claim 13, wherein the vertical reinforcement bracket includes a lower portion fixedly coupled with the curved portion and the lower reinforcement bracket.

* * * * *